(12) United States Patent
Ogawa et al.

(10) Patent No.: US 6,292,220 B1
(45) Date of Patent: Sep. 18, 2001

(54) IMAGE SENSING APPARATUS IN WHICH ELECTRICAL CHARGES ARE TRANSFERRED AT A MODIFIED RATE FROM THE IMAGE SENSOR AND PREFERABLY IN PARALLEL WITH A CHARGE STORAGE INTERVAL

(75) Inventors: Yoshitaka Ogawa, Hachioji; Takayuki Kijima, Akiruno, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/995,742

(22) Filed: Dec. 22, 1997

(30) Foreign Application Priority Data

Dec. 24, 1996 (JP) .................................................. 8-344052

(51) Int. Cl.⁷ .............................. H04N 3/14; H04N 5/238
(52) U.S. Cl. ........................ 348/312; 348/296; 348/314; 348/322; 348/363
(58) Field of Search ........................ 250/208.1; 348/222, 348/229, 230, 294, 296, 311, 312, 314, 317, 320–324, 362, 363, 364, 366–368; H04N 3/14, 5/238

(56) References Cited

U.S. PATENT DOCUMENTS

| | | | |
|---|---|---|---|
| 5,719,625 | * | 2/1998 | Tani ..................................... 348/241 |
| 5,737,018 | * | 4/1998 | Shimizu .............................. 348/363 |
| 5,751,352 | * | 5/1998 | Ogawa ................................ 348/364 |
| 5,847,756 | * | 12/1998 | Iura ...................................... 348/363 |
| 5,883,666 | * | 3/1999 | Kyuma ................................ 348/220 |

* cited by examiner

*Primary Examiner*—Wendy R. Garber
*Assistant Examiner*—Ngoc-Yen Vu
(74) *Attorney, Agent, or Firm*—Volpe and Koenig, P.C.

(57) ABSTRACT

An image sensing apparatus includes a CCD having photodiodes, vertical shift registers, and a horizontal shift register; a signal generator supplying pulses for driving the CCD; a light shading element such as a mechanical shutter which shades incident light to the CCD; and a driver controlling the light shading element. The image sensing apparatus performs high-speed discharging of the vertical shift registers from the starting end of the frame next to a frame where a record trigger is generated, and performs charge storage operation into the photodiodes partially in parallel with high-speed discharging. Further, the image sensing apparatus stops high-speed discharging at the same time as completion of the charge storage operation, furthermore, and completely shades the CCD by performing a closing operation of the light shading element within a residual period of the same frame.

10 Claims, 9 Drawing Sheets

1: PHOTODIODE
2: VERTICAL SHIFT REGISTER
3: HORIZONTAL SHIFT REGISTER
4: SIGNAL DETECTOR

11: LENS
12: LIGHT SHADING MEANS
13: CCD
14: SIGNAL PROCESSING CIRCUIT
15: VIDEO SIGNAL
16: DRIVER
17: SIGNAL GENERATOR
18: CPU
19: DSP

IMAGE SENSING APPARATUS IN WHICH ELECTRICAL CHARGES ARE TRANSFERRED AT A MODIFIED RATE FROM THE IMAGE SENSOR AND PREFERABLY IN PARALLEL WITH A CHARGE STORAGE INTERVAL

BACKGROUND OF THE INVENTION

1. Field of the Invention

The present invention relates to an image sensing apparatus, and more particularly to an image sensing apparatus having an image sensing device including a photoelectric conversion device section, vertical shift registers, and a horizontal shift register.

2. Related Art Statement

Various types of image sensing apparatuses converting subject images optically formed into electric signals have been proposed. These types of image sensing apparatuses each have, for example, an image sensing device including a photoelectric conversion device section, vertical shift registers, and a horizontal shift register. Then, using this image sensing device, the image sensing apparatus converts the above-mentioned optical subject image into an electric signal.

Although many types of these image sensing devices are known, for example, the construction of a vertical overflow drain type CCD will be described with reference to a block diagram of an embodiment according to the present invention that is shown in FIG. 1. In addition, here, an interline transfer type CCD will be described.

This CCD comprises: photodiodes 1 that are arranged two-dimensionally in a horizontal direction and a vertical direction and store electric charges by receiving light; vertical shift registers 2 that receive the electric charges stored in these diodes 1 through transfer gates not shown and thereafter transfer them in a vertical direction in order; a horizontal shift register 3 that sequentially transfers in a horizontal direction the electric charges transferred from these vertical shift registers 2; and a signal detector 4 that amplifies and outputs an output signal from the horizontal shift register 3.

FIG. 2 also relates to an embodiment of the present invention, and a block diagram showing the construction of an image sensing apparatus having a CCD like the CCD shown in FIG. 1. The construction of the image sensing apparatus will be described with reference to FIG. 2.

This image sensing apparatus comprises:

a lens 11 forming a subject light beam on a light receiving plane of a CCD 13 described later; a light shading element 12 composed of, for example, a mechanical shutter controlling whether the element permits the subject light beam from this lens 11 to pass or not; a CCD 13 converting into an electric signal the subject light beam passed through the light shading element 12; a signal processing circuit 14 outputting as a video signal 15 the electric signal from this CCD 13 after performing various processing on the signal; a driver 16 controlling the light shading element 12; a signal generator 17 supplying pulses for controlling a signal charge storage period in the photodiodes 1 of the CCD 13, pulses for driving the vertical shift registers 2, pulses for the horizontal shift register 3, and pulses for driving the signal processing circuit 14 so as to synchronize it with the CCD 13; and a CPU 18 totally controlling each of the circuits including the driver 16 and the signal generator 17. In addition, the signal processing circuit 14 and the signal generator 17 are built in a digital signal processor (called a DSP in figures) 19.

Next, each signal at the time of driving an image sensing apparatus, having the construction as described above, with related art is expressed in a timing chart shown in FIG. 10. FIG. 10 shows a vertical sync signal VD, transfer gate pulses TG, sub-pulses SUB, vertical shift register transfer pulses VT1, VT2, VT3, and VT4, clamp pulses CLP, a light shading element, and a CCD signal.

The vertical sync signal VD is composed of a pulse train (here, defined as a frame) defining predetermined unit periods for each obtaining a signal expressing an image, and respective periods defined by respective pulses are called V1, V2, V3, V4, V5, V6, V7, V8, and so on.

The transfer gate pulses TG are the pulses determining the timing when electric charges stored in the photodiodes 1 are transferred to the vertical shift registers 2. Further, respective pulses referred to as TG0, TG1, TG2, TG3, TG4, TG5, TG6, and TG7 are outputted synchronously with respective pulses defining the periods V1, V2, V3, V4, V5, V6, V7, and V8.

The sub-pulses SUB, in this vertical overflow drain type CCD, are the pulses for vertically discharging the electric charges generated in the photodiodes 1. The electric charges are discharged while the sub-pulses are outputted, and the electric charges are stored in the photodiodes 1 when the pulses are stopped during the time intervals tb1, tb2, tb3, tb4, tb5, tb6, and tb7. Furthermore, by controlling this charge storage time, a so-called device shutter controlling effective exposure time is achieved. Still further, the charge storage time in the photodiodes 1 is determined on the basis of the result obtained by performing photometry of a subject image with photometry means not shown. This charge storage time is controlled by these sub-pulses which further fragment the one frame period.

The vertical shift register transfer pulses VT1, VT2, VT3, and VT4 are the pulses for driving the vertical shift registers 2 and thereby sequentially transferring the electric charges to the horizontal shift register 3.

The clamp pulses CLP are the pulses for clamping an optical black portion of an output signal from the CCD 13, which stabilize the potential level of a video signal and keep a black level stable.

The light shading element 12 normally open and, after electric charges are stored in the photodiodes 1 by a record trigger, the element 12 shades light when the electric charges are transferred.

The output signal from the CCD 13 is composed of optical black portions in the vertical direction as shown in time intervals to1 and to2, and effective periods each of which is the period of the subject image sandwiched by the optical black portions. Further, usually, the signal level in the effective period is higher than the signal levels in the optical black portions.

Conventionally, when image-sensing is actually performed, vertical shift register transfer pulses VT1, VT2, VT3, and VT4 are outputted in succession if a record trigger is issued, for example, by pressing an image-sensing button and the like in the period V3. Owing to the transfer pulses, unnecessary electric charges in the vertical shift registers 2 are discharged at high speed as shown in a time interval ta.

After that, in a period V4, electric charges are stored in the photodiodes 1 on the basis of a predetermined exposure period included in a time interval tb4 of the sub-pulses SUB, that is, this time interval tb4 becomes an exposure period of one frame of image.

The image exposed in this manner in the time interval tb4 within the period V4 is outputted in a period V5 as a signal CS4. This signal CS4 is a CCD signal that is outputted from the signal detector 4 as the result of exposure caused by the record trigger.

In the period V5 when this signal of the CCD 13 is read, the light shading element 12 is closed after the time interval of closing operation, tm so that light may not reach the CCD 13. Then, this light shading element 12 is opened by the driver 16 driving the light shading element again in and after the start of subsequent period V6.

The image received by the CCD 13 during the period V5 when this light shading element 12 is closed is outputted in the period V6 as a signal CS5. Since this signal CS5 is a CCD signal in the period when the light is shaded by the light shading element 12, the signal levels in the optical black portions are approximately equal to the level in the effective period.

In this manner, related art means for driving a CCD discharges at high speed the electric charges in the vertical shift registers 2 in the period V3 when the record trigger is outputted. Then, the means stores the electric charges in the photodiodes 1 in the time interval tb4 included in the next period V4, and further, closes the light shading element 12 for transferring the electric charges in the next period V5. Furthermore, the means opens the light shading element 12 again in the subsequent period V6.

However, response time is necessary to close the light shading element 12 in the above-mentioned related art means for driving a CCD. Therefore, even if a close command is issued at the starting end of the period V5, the time interval tm is necessary to completely achieve the closing operation. Owing to this, the CCD 13 is exposed even in the period V5 when the electric charges are transferred.

Therefore, since the electric charges are generated in the photodiodes 1, and particularly, in case a subject has high intensity, a part of the generated electric charges may be mixed in transfer parts of the vertical shift registers 2 even if the electric charges are vertically discharged with using the sub-pulses SUB. Hence, some smears may be superposed on an original CCD signal.

This is not limited to the time interval tm when the electric charges are generated, but, even after the light shading element 12 is completely closed, the electric charges generated in the time interval tm may remain behind in the substrate of the photodiodes 1. Therefore, the residual electric charges may be transferred by the vertical shift registers 2. In addition, although the smears in the transfer parts can be removed for a while, the smears mixed in the transfer operation in the period V4 can not be removed.

SUMMARY OF THE INVENTION

An object of the present invention is, therefore, to provide an image sensing apparatus with which images of good quality can be obtained.

Another object of the present invention is to provide an image sensing apparatus with which an original signal of an image sensing device can be obtained without a smear being superposed on the original signal.

According to one aspect of the present invention, there is provided an image sensing apparatus comprising an image sensing device that includes a photoelectric conversion device section, vertical shift registers, and a horizontal shift register, where a signal charge storage period corresponding to an effective exposure time can be controlled by controlling a time interval when signal charges generated in the photoelectric conversion device section are integrated, and the signal charges stored in the photoelectric conversion device section during the signal charge storage period can be read through the vertical shift registers and the horizontal shift register, an image sensing device driving circuit that supplies pulses for controlling the signal charge storage period of said image sensing device, pulses for driving the vertical shift registers, and pulses for driving the horizontal shift register, a light shading element for shading incident light to the photoelectric conversion device section of said image sensing device, and a light shading operation control element for controlling operation timing of said light shading element, said image sensing device driving circuit continuously performing discharge operation of unnecessary electric charges by driving the vertical shift registers and the horizontal shift register at a speed higher than that at the time of usual signal charge transfer driving from the beginning of a predetermined unit period to a time interval, including the signal charge storage period, in the predetermined unit period used for obtaining a signal expressing an image by supplying said respective pulses to the image sensing device, and stopping said discharge operation of the unnecessary electric charges just before an endpoint of the signal charge storage period in said unit period, said light shading operation control element controlling the operation timing of said light shading element so that a substantial light shading state to the photoelectric conversion device section of said image sensing device may be established within said unit period after the endpoint of said signal charge storage period.

According to another aspect of the present invention, there is provided an image sensing apparatus comprising an image sensing device that includes a photoelectric conversion device section, vertical shift registers, and a horizontal shift register, where a signal charge storage period corresponding to an effective exposure time is controlled by controlling a time interval when signal charges generated in the photoelectric conversion device section are integrated, and the signal charges stored in the photoelectric conversion device section during the signal charge storage period can be read through the vertical shift registers and the horizontal shift register, an image sensing device driving circuit that supplies pulses for controlling the signal charge storage period to said image sensing device, pulses for driving the vertical shift registers, and pulses for driving the horizontal shift register, a light shading element for shading incident light to the photoelectric conversion device section of said image sensing device, and a light shading operation control element for controlling operation timing of said light shading element, said image sensing device driving circuit supplying said pulses to said image sensing device to control said image sensing device so that a time interval from a starting end to a trailing end of said signal charge storage period may position by means of said light shading operation control element within a predetermined period when incident light to the photoelectric conversion device section of said image sensing device is not shaded continuously by the light shading element.

According to a further aspect of the present invention, there is provided an image sensing apparatus comprising an image sensing device that includes a photoelectric conversion device section, vertical shift registers, and a horizontal shift register, where a signal charge storage period corresponding to an effective exposure time is controlled by controlling a time interval when signal charges generated in the photoelectric conversion device section are integrated, and the signal charges stored in the photoelectric conversion device section during the signal charge storage period can be read through the vertical shift registers and the horizontal shift register, an image sensing device driving circuit that supplies pulses for controlling the signal charge storage period to said image sensing device, pulses for driving the vertical shift register, and pulses for driving the horizontal shift register, a light shading element for shading incident light to the photoelectric conversion device section of said image sensing device, and a light shading operation control element for controlling operation timing of said light shading element, said image sensing device driving circuit controlling supply of said pulses to said image sensing device so as to make said vertical shift registers stop charge transfer operation during a period of time in which said light shading element has shaded the incident light to the photoelectric conversion device section of the image sensing device or during an operation period of time which is in the process to reach said period of time in which said light shading element has shaded the incident light to the photoelectric conversion device section, by control operation of said light shading operation control element.

According to a still further aspect of the present invention, there is provided an image sensing apparatus comprising an image sensing device that includes a photoelectric conversion device section, vertical shift registers, and a horizontal shift register, where a signal charge storage period corresponding to an effective exposure time is controlled by controlling a time interval when signal charges generated in the photoelectric conversion device section are integrated, and the signal charges stored in the photoelectric conversion device section during the signal charge storage period can be read through the vertical shift registers and the horizontal shift register, an image sensing device driving circuit that supplies pulses for controlling the signal charge storage period to said image sensing device, pulses for driving the vertical shift registers, and pulses for driving the horizontal shift register, a light shading element that can control operation timing for shading incident light to the photoelectric conversion device section of said image sensing device, and a light shading operation control element for controlling operation timing of said light shading element, said image sensing device driving circuit controlling supply of said pulses to said image sensing device so as to perform charge transfer operation in said vertical shift registers at a speed lower than that of usual signal charge transfer from a period when said light shading element shades incident light to the photoelectric conversion device section of the image sensing device or during an operation period of time which is in the process to reach said period of time in which said light shading element has shaded the incident light to the photoelectric conversion device section, by control operation of said light shading operation control element.

According to a further aspect of the present invention, there is provided an image sensing apparatus comprising an image sensing device that includes a photoelectric conversion device section, vertical shift registers, and a horizontal shift register, where a signal charge storage period corresponding to an effective exposure time is controlled by controlling a time interval when signal charges generated in this photoelectric conversion device section are integrated, and the signal charges stored in the photoelectric conversion device section during the signal charge storage period can be read through the vertical shift registers and the horizontal shift register, an image sensing device driving circuit that supplies pulses for controlling the signal charge storage period to said image sensing device, pulses for driving the vertical shift register, and pulses for driving the horizontal shift register, a light shading element that can control operation timing for shading incident light to the photoelectric conversion device section of said image sensing device, and a light shading operation control element for controlling operation timing of said light shading element, said image sensing device driving circuit controlling supply of said pulses to said image sensing device so as to perform charge transfer operation in said vertical shift registers at a speed lower than that of usual signal charge transfer during an operation period that is a process to a state where said light shading element shades incident light to the photoelectric conversion device section of the image sensing device by control operation of said light shading operation control element, and being controlled so that occurrence of charge transfer pulses in said operation period may be discrete at the extent where influence of a defect in the vertical shift registers does not occur.

According to a still further aspect of the present invention, there is provided an image sensing apparatus comprising an image sensing device that includes a photoelectric conversion device section, vertical shift registers, and a horizontal shift register, where a signal charge storage period corresponding to an effective exposure time is controlled by controlling a time interval when signal charges generated in this photoelectric conversion device section are integrated, and the signal charges stored in the photoelectric conversion device section during the signal charge storage period can be read through the vertical shift registers and the horizontal shift register, an image sensing device driving circuit that supplies pulses for controlling the signal charge storage period to said image sensing device, pulses for driving the vertical shift registers, and pulses for driving the horizontal shift register, a light shading element that can control operation timing for shading incident light to the photoelectric conversion device section of said image sensing device, and a light shading operation control element for controlling operation timing of said light shading element, said image sensing device driving circuit stopping clamp pulses during a period when unnecessary electric charges are included in an optical black portion by discharge operation from the beginning of a predetermined unit period in the predetermined unit period used for obtaining a signal expressing an image by supplying said respective pulses to the image sensing device, said light shading operation control element controlling operation timing of said light shading element so that a substantial light shading state to the photoelectric conversion device section of said image sensing device may be established within said unit period after the endpoint of said signal charge storage period.

Other objects and features will be clarified from the following description with reference to the attached drawings.

DETAILED DESCRIPTION OF THE PREFERRED EMBODIMENTS

Embodiments of the present invention will be described below with reference to drawings.

Figure 1:
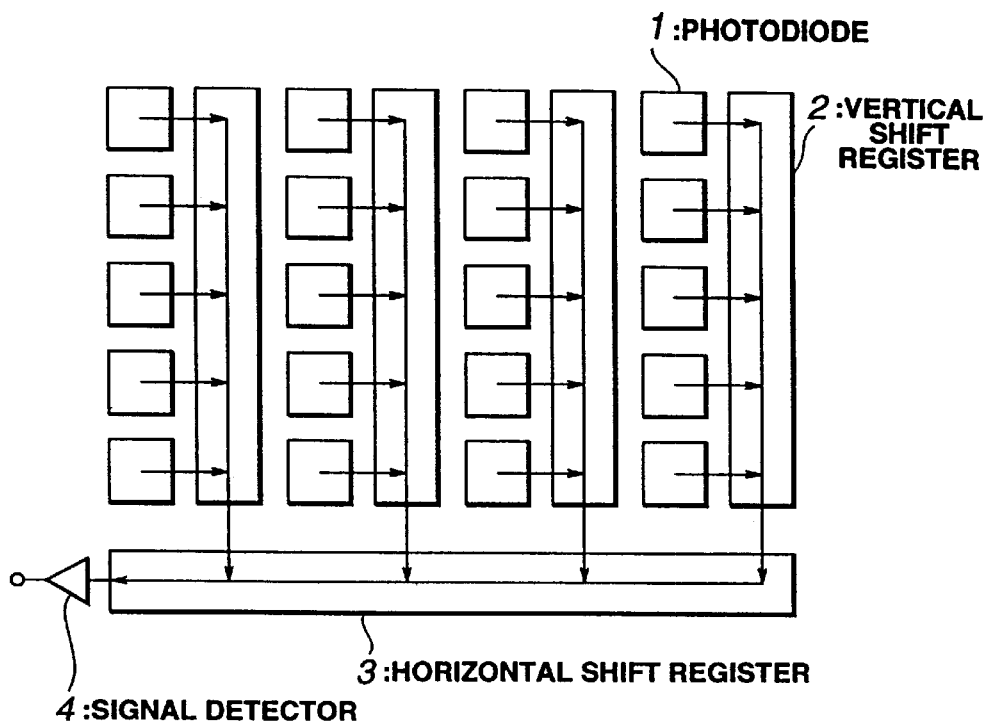
FIG. 1 is a block diagram showing the construction of a vertical overflow drain type CCD of a first embodiment according to the present invention.
Figure 2:
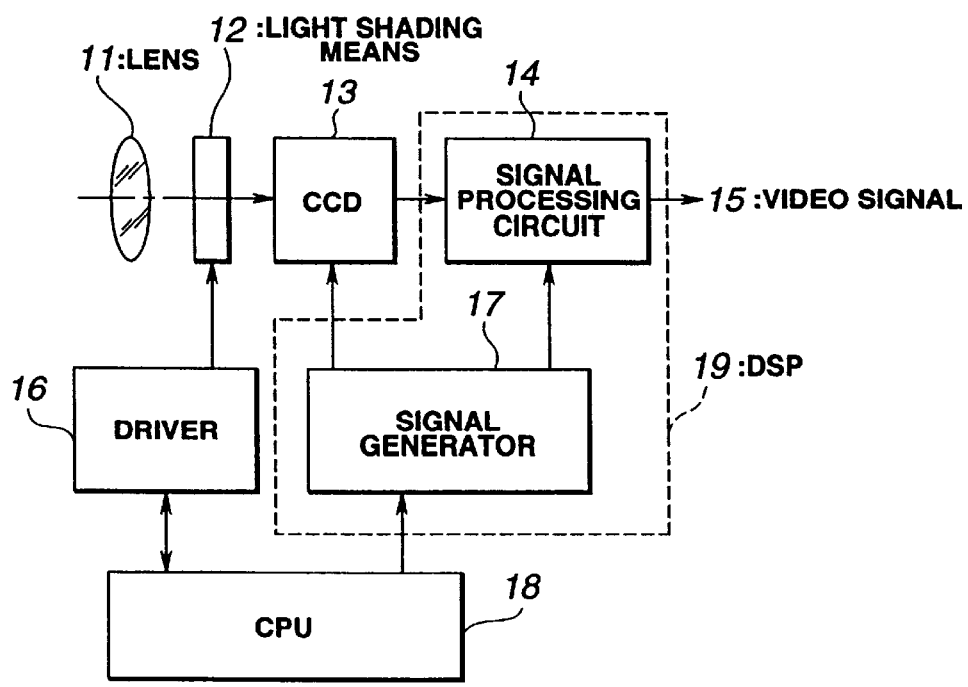
FIG. 2 is a block diagram showing the construction of the first embodiment of an image sensing apparatus.
Figure 3:
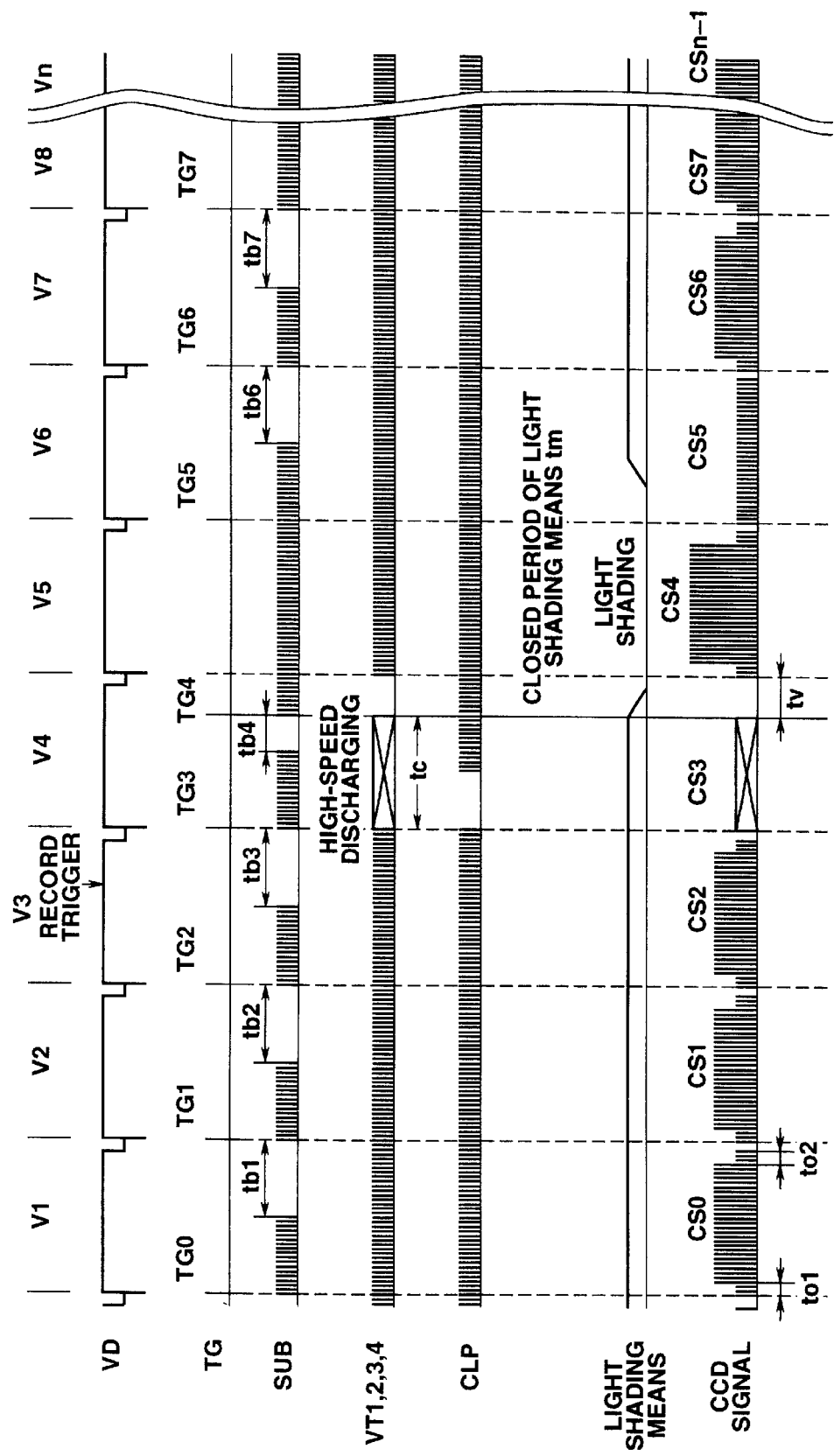
FIG. 3 is a timing chart showing respective signals when the first embodiment of the image sensing apparatus is driven.

FIGS. 1 to 3 show a first embodiment of the present invention, and FIG. 1 is a block diagram showing the construction of a vertical overflow drain type CCD. Further, FIG. 2 is a block diagram showing the construction of an image sensing apparatus, and FIG. 3 is a timing chart showing respective signals when the image sensing apparatus is driven.

As shown in FIG. 1, this CCD comprises: photodiodes 1 being a photoelectric conversion device section that is arranged two-dimensionally in a horizontal direction and a vertical direction, receives light, and stores electric charges; vertical shift registers 2 receiving the electric charges stored in the diodes 1 through transfer gates not shown and thereafter transferring them in a vertical direction in order; a horizontal shift register 3 sequentially transferring in a horizontal direction the electric charges transferred from the vertical shift registers 2; and a signal detector 4 amplifying and outputting an output signal derived from the horizontal shift register 3.

As shown in FIG. 2, this image sensing apparatus comprises: a lens 11 forming a subject light beam on a light receiving plane of a CCD 13 described later; a light shading element 12 composed of, for example, a mechanical shutter controlling whether the element 12 makes the subject light beam from lens 11 pass or not; the CCD 13 converting into an electric signal the subject light beam passed through light shading element 12; a signal processing circuit 14 outputting as a video signal 15 the electric signal from this CCD 13 after performing various processing on the signal; a driver 16 being a light shading operation control element composed of, for example, a circuit and a mechanism that cooperatively control the light shading element 12; a signal generator 17 supplying pulses for controlling a signal charge storage period in the photodiodes 1 to the CCD 13, pulses for driving the vertical shift registers 2, pulses for driving the horizontal shift register 3, and pulses for driving the signal processing circuit 14 so as to synchronize it with the CCD 13; and a CPU 18 totally controlling each of circuits including the driver 16 and the signal generator 17. In addition, the signal processing circuit 14 and the signal generator 17 are built in a digital signal processor (called a DSP in figures) 19.

Subsequently, the timing chart in FIG. 3 shows respective signals when the image sensing apparatus having the above-mentioned construction is driven. FIG. 3 shows a vertical sync signal VD, transfer gate pulses TG, sub-pulses SUB, vertical shift register transfer pulses VT1, VT2, VT3, and VT4, clamp pulses CLP, a light shading element, and a CCD signal.

The vertical sync signal VD is composed of a pulse train defining predetermined unit periods for each obtaining a signal expressing an image, and respective periods defined by respective pulses are called V1, V2, V3, V4, V5, V6, V7, V8, and so on.

The transfer gate pulses TG are the pulses determining the timing when electric charges stored in the photodiodes 1 are transferred to the vertical shift registers 2. Further, respective pulses referred to as TG0, TG1, TG2, TG3, TG4, TG5, TG6, and TG7 are outputted synchronized with respective pulses in the vertical sync signal VD, defining the periods V1, V2, V3, V4, V5, V6, V7, and V8. In addition, the pulse referred to the reference code TG4, as described later, is issued on the timing when the closing operation of the light shading element 12 can be completed within the period V4.

The sub-pulses SUB, in vertical overflow drain type CCD 13, are the pulses for vertically discharging the electric charges generated in the photodiodes 1. The electric charges are discharged while the sub-pulses are outputted, and the electric charges are stored in the photodiodes 1 when the pulses are stopped like the time intervals tb1, tb2, tb3, tb4, tb5, tb6, and tb7. Furthermore, by controlling this charge storage time, a so-called device shutter controlling effective exposure time is achieved. Still further, the charge storage time in the photodiodes 1 is determined on the basis of the result obtained by performing photometry of a subject image with photometry means not shown. This charge storage time is controlled by these sub-pulses SUB further fragmenting the one frame of period.

The vertical shift register transfer pulses VT1, VT2, VT3, and VT4 are the pulses driving the vertical shift registers 2 and thereby making the electric charges sequentially transferred to the horizontal shift register 3. If the record trigger is issued, the transfer pulses perform high-speed discharging of the unnecessary electric charges in the vertical shift registers 2 as shown in the time interval tc.

The clamp pulses CLP are the pulses each clamping an optical black portion of an output signal from the CCD 13, which stabilize the potential level of a video signal and keeps a black level stable.

The light shading element 12 normally opens, and, after electric charges are stored in the photodiodes 1 by the record trigger, the element 12 shades light when the electric charges are transferred.

The output signal from the CCD 13 is composed of optical black portions in the vertical direction as shown in time intervals to1 and to2, and effective periods each of which is the period of the subject image sandwiched by the optical black portions. Further, usually, the signal level in the effective period is higher than the signal levels in the optical black portions.

Next, the effects of the present embodiment will be described along with FIG. 3 with reference to FIGS. 1 and 2.

If a record trigger is issued due to pressing an image-sensing button, for example, in the period V3, a command is outputted from the CPU 18, the command making the signal generator 17 perform read control of electric charges.

In addition, when the process enters into the period V4, the vertical shift register transfer pulses VT1, VT2, VT3, and VT4 are continuously outputted from the beginning of the period V4. Hence, the unnecessary electric charges in the vertical shift registers 2 are discharged at high speed as shown in the time interval tc. This signal discharged at high speed is outputted as a signal CS3.

During this high-speed discharging, electric charges are stored in the photodiodes 1 on the basis of a predetermined exposure period in the time interval tb4 of the sub-pulses SUB, the charge storage is completed when a transfer gate pulse referred to the code TG4 is outputted, and the high-speed discharging is also completed.

When this time interval tb4 is ended, the closing operation of the light shading element 12 is started under the control of the driver 16 on the basis of the command issued by the CPU 18. The closing operation is completed and light is completely shaded from the CCD within this period V4. Here, it is well known that, in the light shading element 12, especially if it is composed of a mechanical shutter, the length variance (tolerance) of the time interval tm when the closing operation is performed may occur. Then, the transfer gate pulse referred to the code TG4 is set so that the closing operation may be definitely completed within the period V4 while the tolerance of the time interval tm in company with the closing operation of the light shading element 12 is considered. Therefore, the timing of starting the charge storage in the photodiodes 1 is determined by going back by the time interval tb4 from the point of the transfer gate pulse referred to the code TG4.

In addition, after completion of the charge storage in the time interval tb4 and the high-speed discharging in the time interval tc, generation of the vertical shift register transfer pulses VT1, VT2, VT3, and VT4 is stopped during a time interval tv being an interval until the period V4 is ended.

Thus, charge transfer is stopped during the time interval tv including the time interval tm when the light shading element 12 performs the closing operation, and hence, signal charges do not change their position in that time.

In this manner, after the closing operation of the light shading element 12 is completely finished and light does not reach the CCD 13, the process goes into the period V5. Then, by driving the vertical shift registers 2 and the horizontal shift register 3, the electric charges stored in the photodiodes 1 in the time interval tb4 within the period V4 are transferred and the signal charges are outputted from the signal detector 4 as a signal CS4. This signal CS4 is a CCD signal outputted as the exposure result by the record trigger.

After that, the light shading element 12 is driven and opened by the driver 16 in a period V6. A signal CS5 outputted in this period V6 is a CCD signal at the time of light being shaded, and hence, signal levels in the optical black portions and signal levels in the effective periods are nearly equal.

If the record trigger is outputted in the period V3 in this manner, the high-speed discharging of the vertical shift registers 2 is performed from the starting end of the next period V4. At the same time, the charge storage in the photodiodes 1 is performed in parallel to this in the time interval tb4 included in the same period V4. Further, the light shading element 12 is driven so that the closing operation may completely finish within the period V4. Then, the electric charges are transferred in the period V5 when the light shading element 12 is completely closed, and the light shading element 12 is opened again in the subsequent period V6.

According to the first embodiment like this, a light shading element is completely closed in a period when electric charges are transferred, and hence, the CCD is not exposed to light. Therefore, it is possible to obtain an essential CCD signal without a smear superposed.

Further, high-speed discharging is performed until the completion of exposure in the same period as one when electric charges are stored in photodiodes, that is, the period next to the period when a record trigger is outputted. Hence, it is possible to completely remove a smear that is generated by light entered into the CCD until the end of exposure. In addition, since a time interval tc for the high-speed discharging is not affected by a time interval tb4 for exposure, it is possible to surely discharge and transfer all the unnecessary electric charges existing in vertical shift registers.

Furthermore, since the signal charges do not move during the closing operation of the light shading element, it is possible to prevent unnecessary electric charges, like ones in a case that a smear occurs, from mixing into the adjacent transfer parts. In this manner, it is possible to enhance image quality because occurrence of light tailing that is a fundamental phenomenon of the smear is suppressed.

Figure 4:
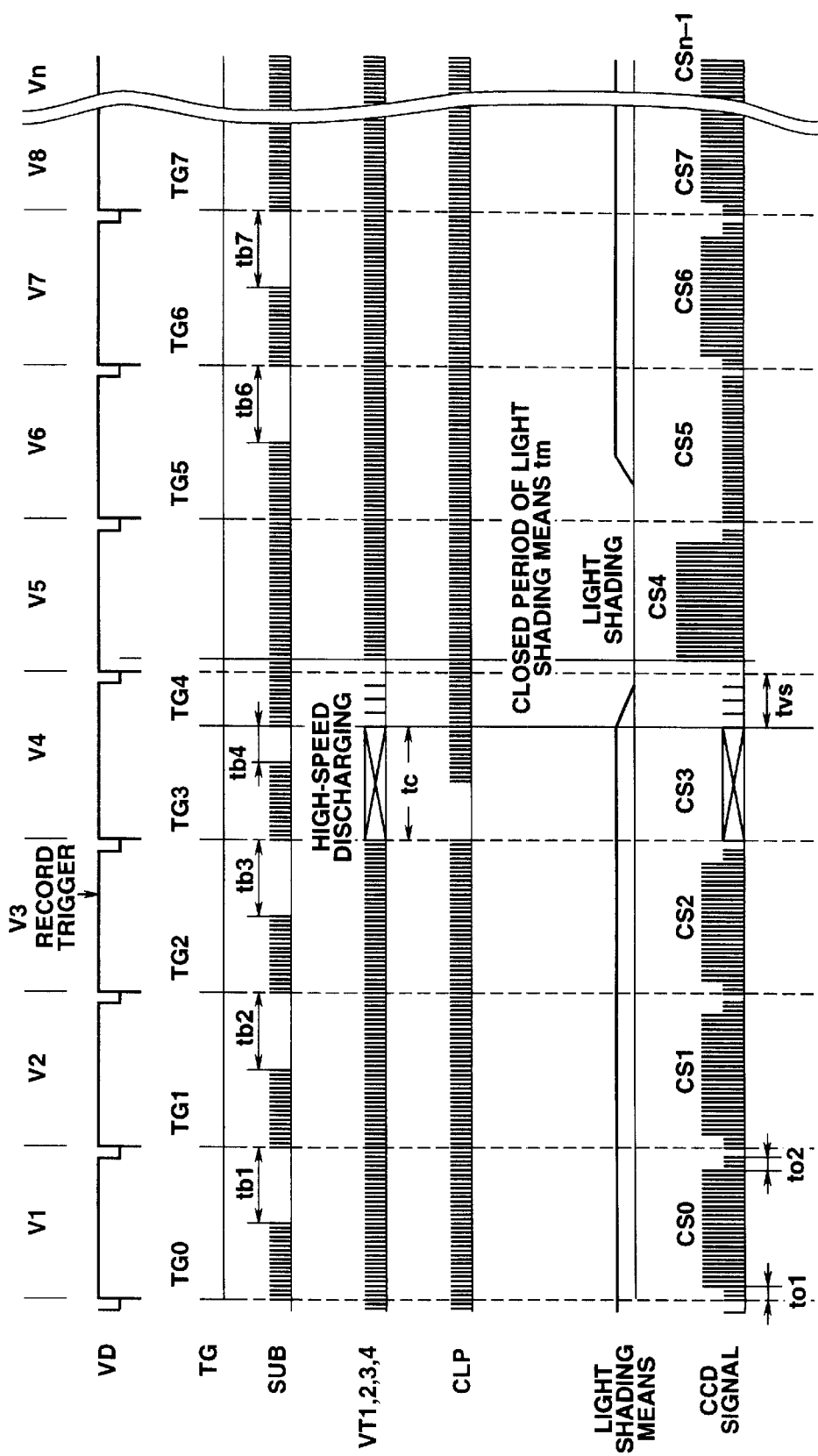
FIG. 4 is a timing chart showing respective signals when a second embodiment of an image sensing apparatus according to the present invention is driven.
Figure 5:
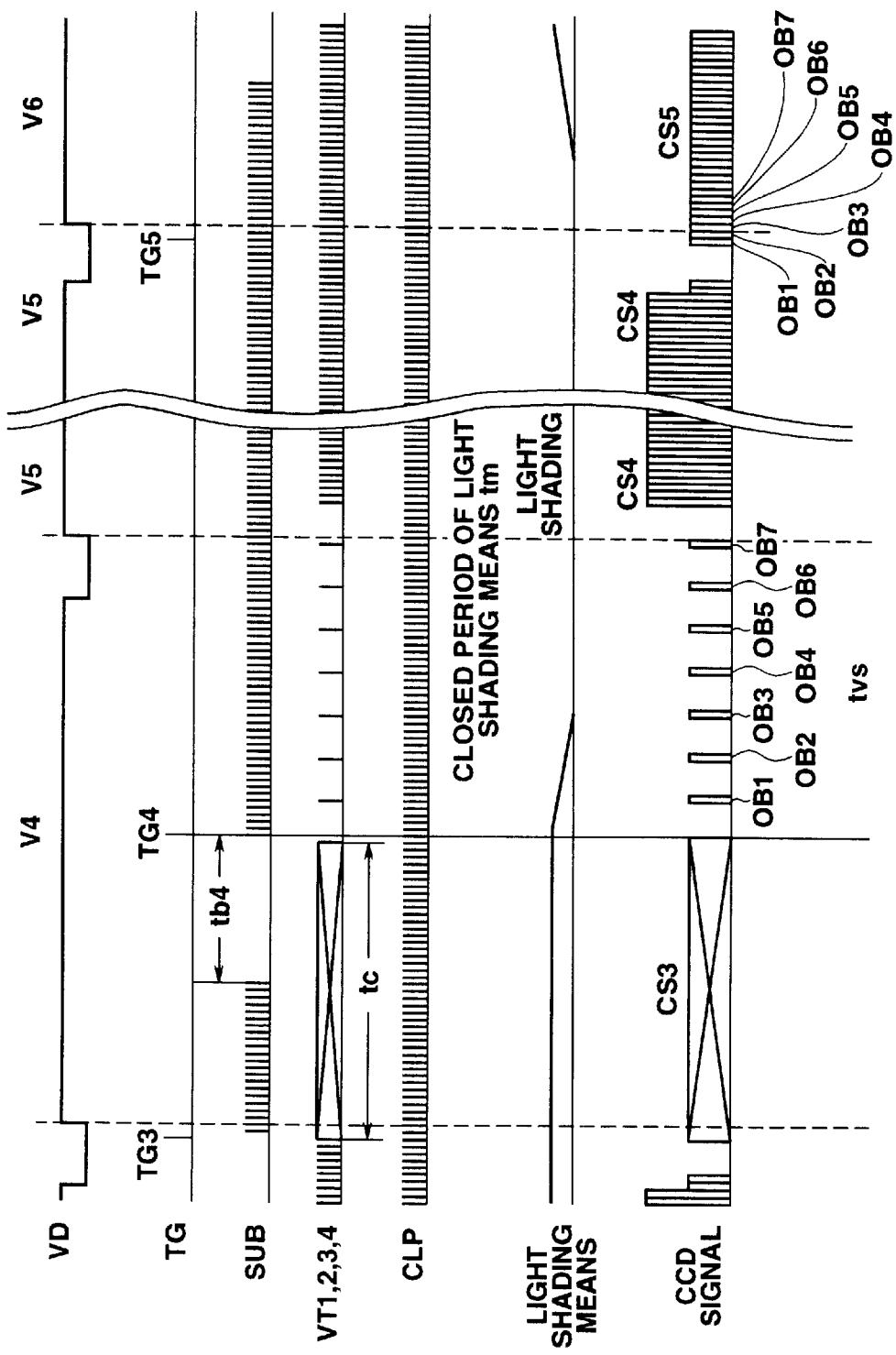
FIG. 5 is a timing chart of a major part of the chart shown in FIG. 4, the timing chart whose time axis is enlarged.

FIGS. 4 and 5 show a second embodiment of the present invention, FIG. 4 is a timing chart showing respective signals when an image sensing apparatus is driven, and FIG. 5 is a timing chart of a major part of the chart shown in FIG. 4, the timing chart whose time axis is enlarged. In this second embodiment, description of portions similar to those in the first embodiment will be omitted, and only the different portions will be mainly described.

This embodiment is characterized in that, after this embodiment completes the charge storage in the time interval tb4 and the high-speed discharging in the time interval tc, this embodiment generates vertical shift register transfer pulses VT1, VT2, VT3, and VT4 at a speed lower than that in a usual read operation, in the time interval tvs that is an interval until the end of the period V4.

Thus, charge transfer is performed at low speed by the vertical shift registers 2 in the time interval tvs including the time interval tm when the light shading element 12 performs the closing operation. In this time, the electric charges in the optical black portion of the signal CS4 are outputted through the horizontal shift register 3.

Then, in synchronism with the vertical shift register transfer pulses VT1, VT2, VT3, and VT4 driven at the low speed, signals OB1 to OB7 corresponding to the number of the elements of the optical black portion are outputted from the signal detector 4 in the period V4 as shown in FIG. 5.

Still further, in FIG. 5, only the signals OB1 to OB7 are shown by one horizontal line as output signals from the optical black portion. However, an actual CCD is composed of more pixels, and hence, it is apparent that more signals are outputted.

The second embodiment like this exhibits the effects approximately similar to those in the first embodiment. At the same time, by driving the vertical shift register transfer at the low speed, positions of the signal charges are moved a little. However, the number of the adjacent transfer parts having possibilities of electric charge mixing is suppressed within the number of lines transferred by driving at the low speed. Hence, the spread of the smear becomes extremely narrower than that in the transfer at usual speed.

In addition, although the improvement effect to a smear becomes smaller than that in the first embodiment, it is possible to improve malfunctions such as point defects and increase of dark current both of which are caused by the defect of the elements composing the vertical shift registers, because the vertical shift register transfer is never stopped.

Further, since the electric charges transferred at the low speed are only the electric charges in the optical black portion, it is possible to read the electric charges, regarding an exposure image, as usual in the next frame.

Figure 6:
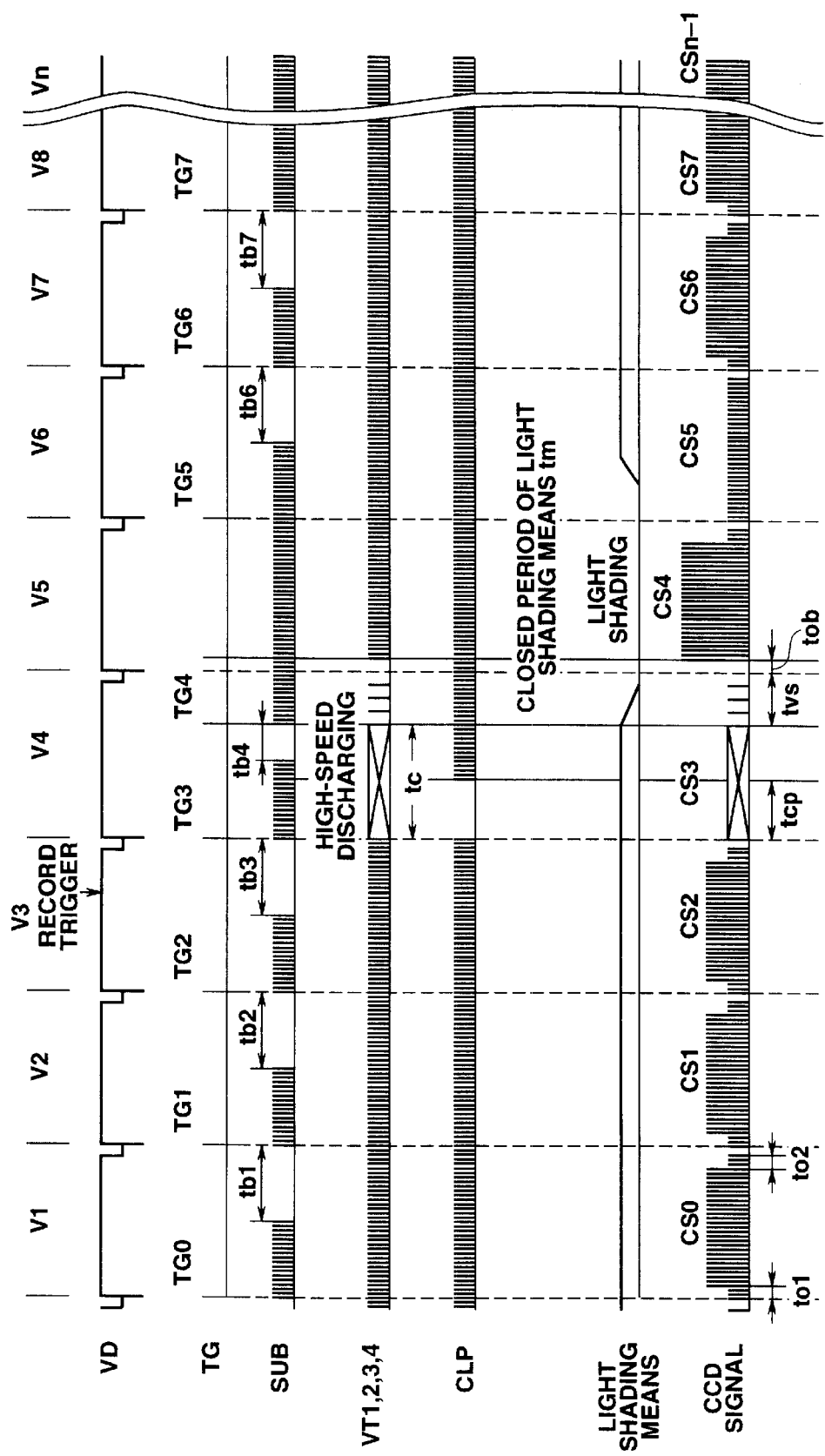
FIG. 6 is a timing chart showing respective signals when a third embodiment of an image sensing apparatus according to the present invention is driven.
Figure 7:
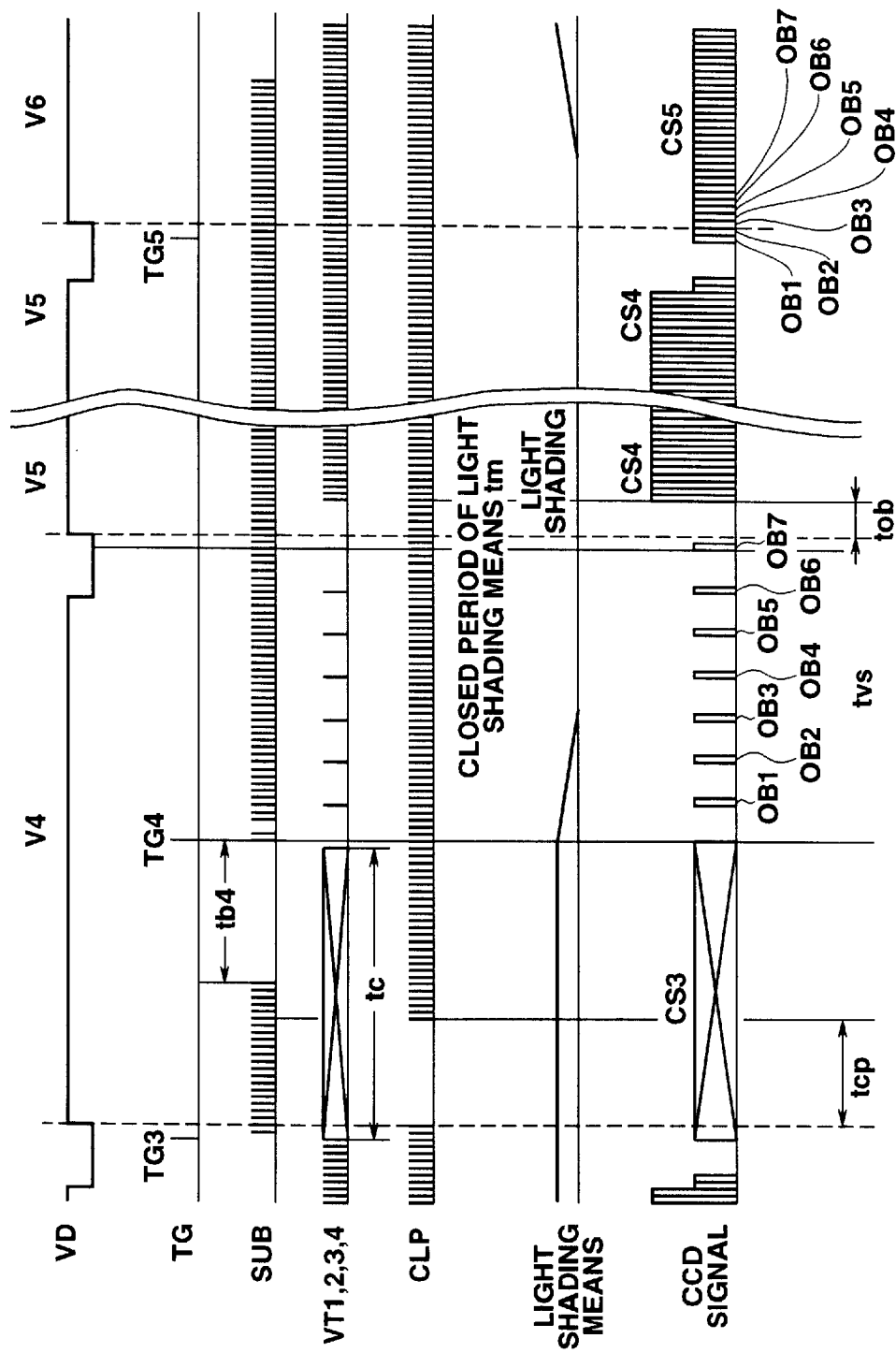
FIG. 7 is a timing chart of a major part of the chart shown in FIG. 6, the timing chart whose time axis is enlarged.

FIGS. 6 and 7 show a third embodiment of the present invention, FIG. 6 is a timing chart showing respective signals when an image sensing apparatus is driven, and FIG. 7 is a timing chart of a major part of the chart shown in FIG. 6, the timing chart whose time axis is enlarged. In this third embodiment, description of portions similar to those in the first and second embodiments will be omitted, and only the different portions will be mainly described.

In this embodiment, when the high-speed discharging by the vertical shift register transfer pulses VT1, VT2, VT3, and VT4 is started, the clamp pulses CLP are stopped during the time interval tcp necessary for that the unnecessary electric charges more than those in the lines corresponding to one frame are discharged.

Further, similar to the second embodiment, this embodiment generates the vertical shift register transfer pulses VT1, VT2, VT3, and VT4 at the low speed in the time interval tvs. Then, after the electric charges corresponding to the number of the elements of the optical black portion are transferred, the process goes to the period V5. In the beginning of that period, the vertical shift register transfer pulses VT1, VT2, VT3, and VT4 are stopped only during the time interval tob, that is, only the period necessary for driving the elements of the optical black portion in the CCD 13.

The third embodiment like this exhibits the effects approximately similar to those in the first and second embodiments. Also, since the vertical shift register transfer is stopped during the period corresponding to the number of elements of the optical black portion read at the low speed, it is possible to read the electric charges, regarding an exposure image, at the same timing as that in usual operation in the next frame.

Further, regarding the electric charges corresponding to elements driven at the low speed so as to suppress excessive signal charges, it is possible to firmly prevent the signal charges at the time of being transferred from mixing into the adjacent transfer parts by stopping the vertical shift register transfer thereafter.

Furthermore, by stopping the clamp pulses CLP during the period when the unnecessary electric charges caused by the discharge operation are included in the part corresponding to the optical black portion, it is possible to stably supply a clamp potential regarding the exposure image.

Figure 8:
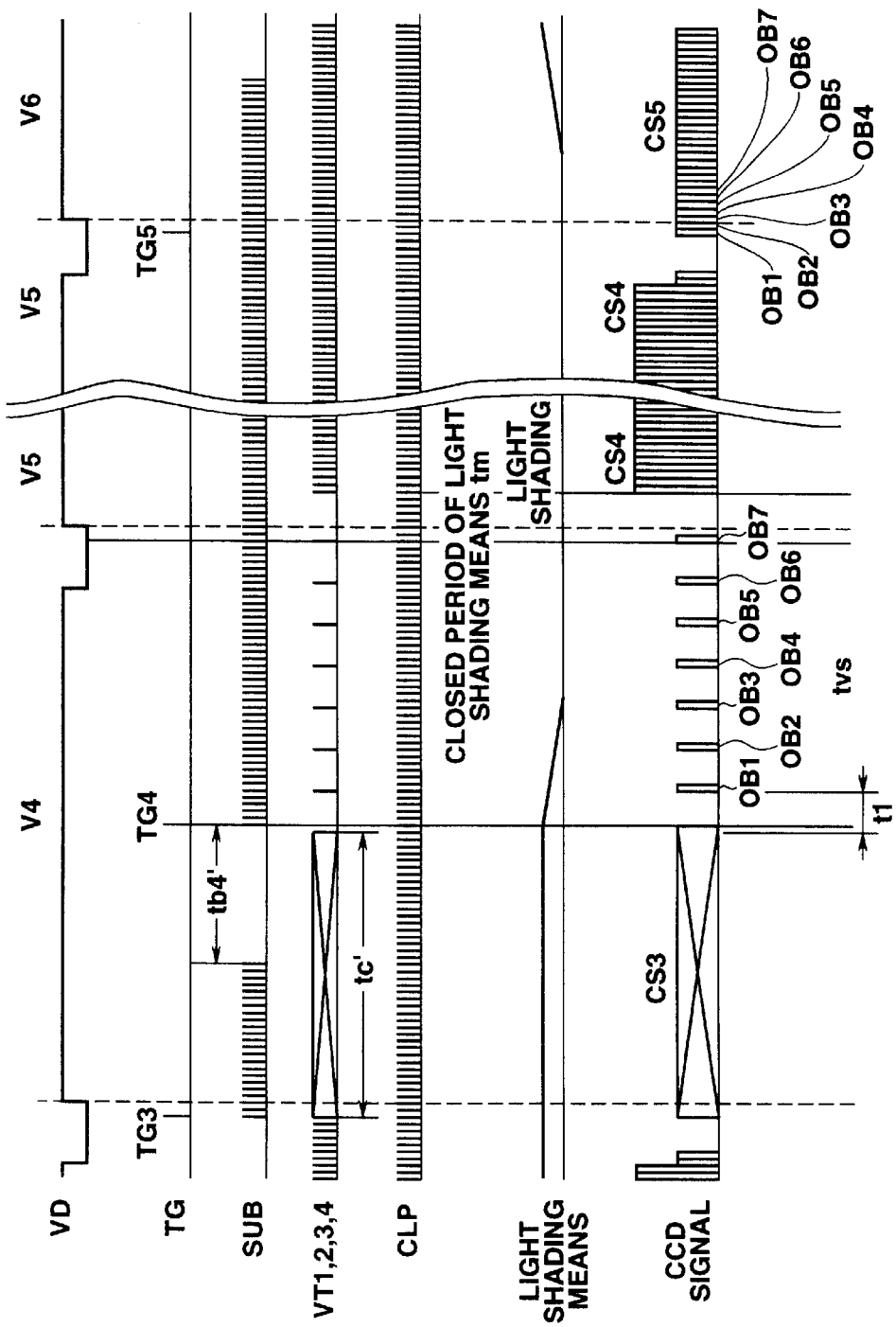
FIG. 8 is a timing chart showing respective signals when vertical shift registers are driven at low speed in certain time intervals in a fourth embodiment of an image sensing apparatus according to the present invention.
Figure 9:
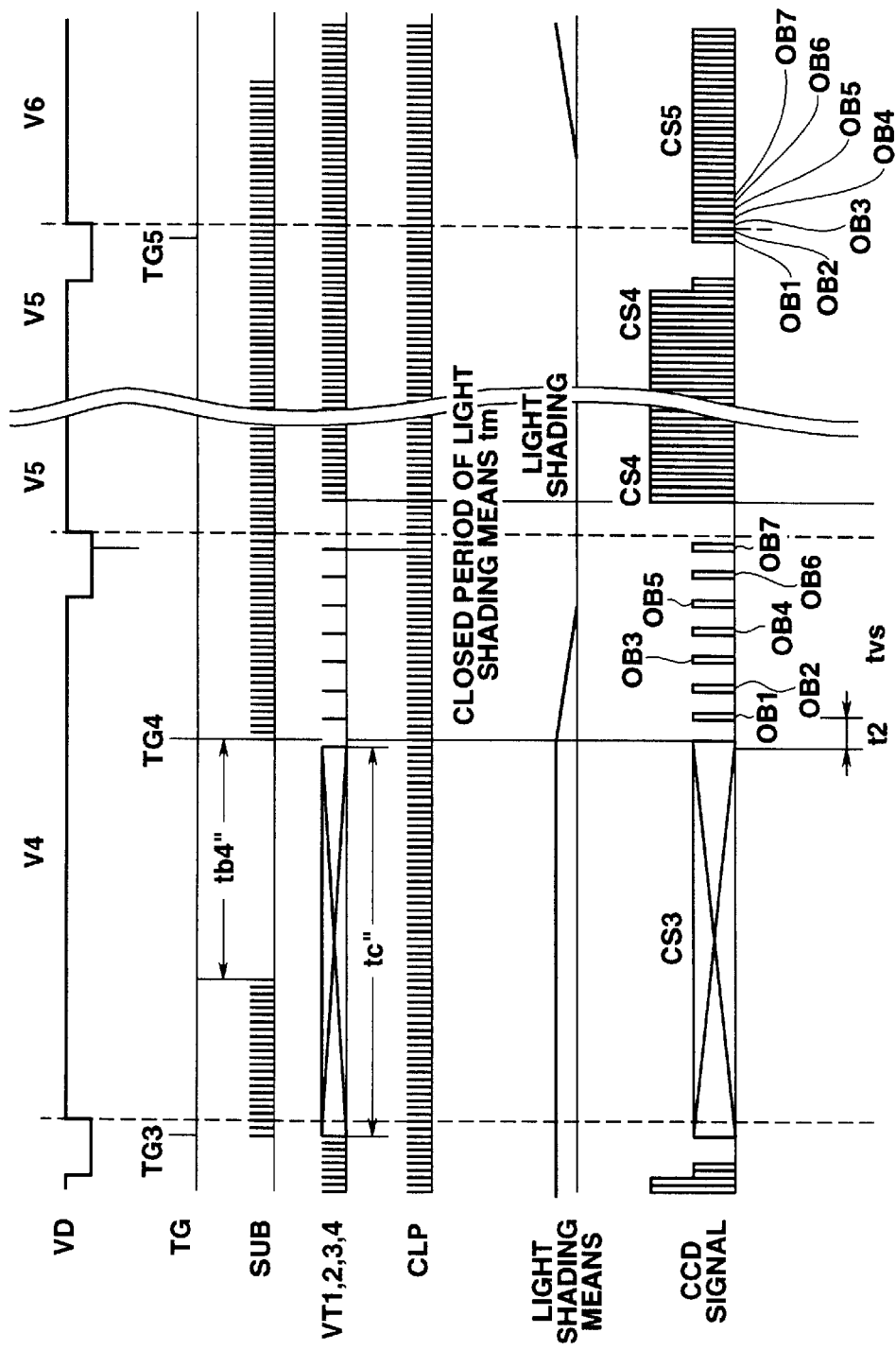
FIG. 9 is a timing chart showing respective signals when the vertical shift registers are driven at low speed in other time intervals in the fourth embodiment.
Figure 10:
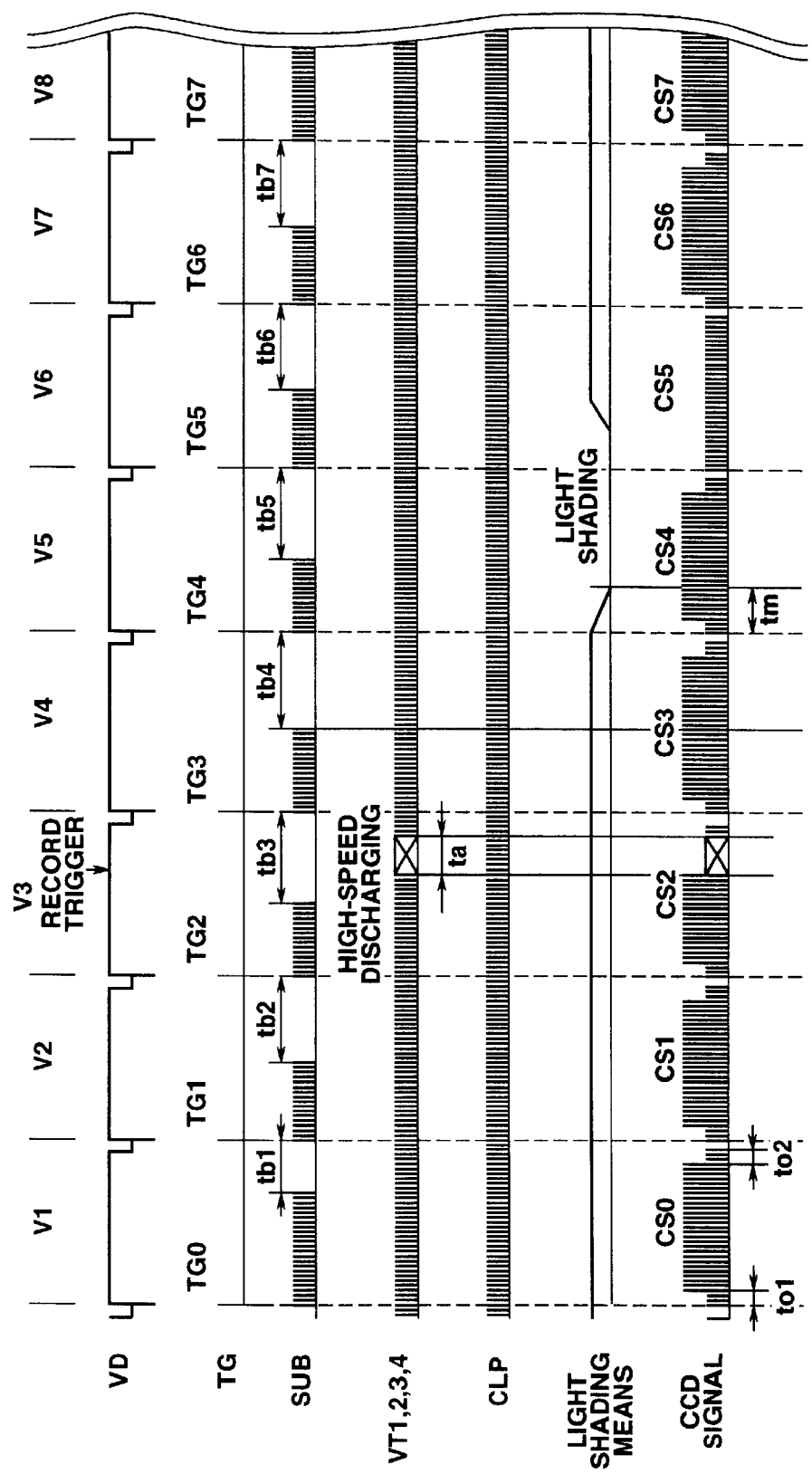
FIG. 10 is a timing chart showing respective signals when an image sensing apparatus is driven by related art.

FIGS. 8 and 9 show a fourth embodiment of the present invention, FIG. 8 is a timing chart showing respective signals when the vertical shift registers are driven at low speed in a certain time interval, and FIG. 9 is a timing chart showing respective signals when the vertical shift registers are driven at low speed in another time interval. In this fourth embodiment, description of portions similar to those in the first to third embodiments will be omitted, and only the different portions will be mainly described.

In this embodiment, when the vertical shift registers 2 are driven at the low speed, the driving speed can be set optionally.

Thus, the length of the time interval tb4 when electric charges are stored in the photodiodes 1 varies due to the intensity of a subject and other image-sensing conditions. In addition, the length of the time interval tc when the high-speed discharging is performed, is also changed corresponding to this, that is, the length of the time interval tvs is changed. Even if the length of the time interval tvs is changed, the driving speed can be changed so that the low-speed driving of the vertical shift registers 2 during the time interval tvs may be performed uniformly. Further, if the closing operation time of the light shading element fluctuates, it is possible to securely shade light before the start of reading in the period V5 by changing the low driving speed of the vertical shift registers 2 in the time interval tvs.

FIG. 8 is an example in the case that, because of, for example, high intensity of a subject, a time interval tb4' when electric charges are stored in the photodiodes 1 is comparatively short and a time interval tc' when the high-speed discharging is performed is also comparatively short. In this time, since the time interval tvs becomes comparatively long, the charge transfer in the optical black portion by the low-speed driving is performed by the pulse train having a comparatively long time period t1.

On the other hand, FIG. 9 is another example in the case that, because of, for example, low intensity of a subject, a time interval tb4" when electric charges are stored in the photodiodes 1 is comparatively long and a time interval tc" when the high-speed discharging is performed is also comparatively long. In this time, since the time interval tvs becomes comparatively short, the charge transfer in the optical black portion by the low-speed driving is performed by the pulse train having a comparatively short time period t2.

The fourth embodiment like this exhibits the effects approximately similar to those in the first to third embodiments. Also, the charge transfer at the low-speed driving in the optical black portion is performed by a uniform pulse train even if the charge storage time in the photodiodes varies. Therefore, since it is possible to keep positions of pixels read from the CCD at the exposure time constant, it hardly occurs that a defect in the vertical shift registers affects the electric charges transferred.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. An image sensing apparatus comprising:
   an image sensing device that includes a photoelectric conversion device section, vertical shift registers, and a horizontal shift register, where a signal charge storage period corresponding to an effective exposure time can be controlled by controlling a time interval when signal charges generated in the photoelectric conversion device section are integrated, and signal charges stored in the photoelectric conversion device section during the signal charge storage period can be read through the vertical shift registers and the horizontal shift register;
   an image sensing device driving circuit that supplies pulses for controlling the signal charge storage period to said image sensing device, pulses for driving the vertical shift registers, and pulses for driving the horizontal shift register;
   a light shading element for shading incident light to the photoelectric conversion device section of said image sensing device; and
   a light shading operation control element for controlling operation timing of said light shading element;
   said image sensing device driving circuit continuously performing discharge operation of unnecessary electric charges by driving the vertical shift registers and the horizontal shift register at a speed higher than that at a time of usual signal charge transfer driving from a beginning of a predetermined unit period to a time interval, including the signal charge storage period, in the predetermined unit period used for obtaining a signal expressing an image by supplying said respective pulses to the image sensing device, and stopping said discharge operation of unnecessary electric charges just before an endpoint of the signal charge storage period in said unit period, said light shading operation control element controlling the operation timing of said light shading element so that a substantial light shading state to the photoelectric conversion device section of said image sensing device may be established within said unit period after the endpoint of said signal charge storage period.

2. An image sensing apparatus comprising:

an image sensing device that includes a photoelectric conversion device section, vertical shift registers, and a horizontal shift register, where a signal charge storage period corresponding to an effective exposure time is controlled by controlling a time interval when signal charges generated in said photoelectric conversion device section are integrated, and signal charges stored in the photoelectric conversion device section during the signal charge storage period can be read through the vertical shift registers and the horizontal shift register;

an image sensing device driving circuit that supplies: pulses for controlling the signal charge storage period to said image sensing device, pulses for driving the vertical shift registers, and pulses for driving the horizontal shift register;

a light shading element for shading incident light to the photoelectric conversion device section of said image sensing device; and a light shading operation control clement for controlling operation timing of said light shading element, said image sensing device driving circuit supplying said pulses to said image sensing device so as to control said image sensing device so that a time interval from a starting end to a trailing end of said signal charge storage period may be positioned by means of said light shading operation control element within a predetermined period when incident light to the photoelectric conversion device section of said image sensing device is not shaded continuously by the light shading element.

3. An image sensing apparatus according to claim 2, wherein said image sensing device driving circuit further supplies said pulses to said image sensing device so as to control said image sensing device so that a time interval from a starting end to a trailing end of said signal charge storage period may position within a time interval that retracts not less than an allowance including a tolerance of light shading operation time necessary for from start to completion of light shading operation performed by said light shading element, from a trailing end of a unit period in the unit period.

4. An image sensing apparatus according to claim 2, wherein said image sensing device driving circuit further continuously performs discharge operation of unnecessary electric charges by driving the vertical shift registers at a speed higher than that at a time of usual signal charge transfer driving over a time interval that is from a beginning of a predetermined unit period to an endpoint of the signal charge storage period and includes the signal charge storage period, in the predetermined unit period used for obtaining a signal expressing an image by supplying said respective pulses to the image sensing device, and stops said discharge operation of unnecessary electric charges just before the endpoint of said signal charge storage period, wherein said light shading operation control element controls said light shading element to start its light shading operation just after the endpoint of said signal charge storage period.

5. An image sensing apparatus comprising:

an image sensing device that includes a photoelectric conversion device section, vertical shift registers, and a horizontal shift register, where a signal charge storage period corresponding to an effective exposure time is controlled by controlling a time interval when signal charges generated in said photoelectric conversion device section are integrated, and signal charges stored in the photoelectric conversion device section during the signal charge storage period can be read through the vertical shift registers and the horizontal shift register;

an image sensing device driving circuit that supplies pulses for controlling the signal charge storage period to said image sensing device, pulses for driving the vertical shift register, and pulses for driving the horizontal shift register;

a light shading element for shading incident light to the photoelectric conversion device section of said image sensing device; and a light shading operation control element for controlling operation timing of said light shading element, said image sensing device driving circuit controlling supply of said pulses to said image sensing device so as to make said vertical shift registers stop charge transfer operation during a period of time in which said light shading element has shaded incident light to the photoelectric conversion device section of the image sensing device or during an operation period of time which is in the process to reach said period of time in which said light shading element has shaded the incident light to the photoelectric conversion device section by control operation of said light shading operation control element.

6. An image sensing apparatus comprising:

an image sensing device that includes a photoelectric conversion device section, vertical shift registers, and a horizontal shift register, where a signal charge storage period corresponding to an effective exposure time is controlled by controlling a time interval when signal charges generated in said photoelectric conversion device section are integrated, and signal charges stored in the photoelectric conversion device section during the signal charge storage period can be read through the vertical shift registers and the horizontal shift register;

an image sensing device driving circuit that supplies pulses for controlling the signal charge storage period to said image sensing device, pulses for driving the vertical shift registers, and pulses for driving the horizontal shift register;

a light shading element for shading incident light to the photoelectric conversion device section of said image sensing device; and a light shading operation control element for controlling operation timing of said light shading element, said image sensing device driving circuit controlling supply of said pulses to said image sensing device so as to perform charge transfer operation in said vertical shift registers at a speed lower than that of usual signal charge transfer from a period of time in which said light shading element shades incident light to the photoelectric conversion device section of the image sensing device or during an operation period of time which is in the process to reach said period of time in which said light shading element has shaded the incident light to the photoelectric conversion device section by control operation of said light shading operation control element.

7. An image sensing apparatus according to claim 6, wherein said image sensing device driving circuit controls supply of said pulses to said image sensing device so as to perform low-speed charge transfer operations in said image sensing device a frequency of which corresponds to a number of elements of an optical black portion when charge transfer operation in said vertical shift registers is performed at a speed lower than that of usual signal charge transfer during a period of time in which said light shading element shades incident light to the photoelectric conversion device section of the image sensing device or during an operation period of time which is in the process to reach said period of time in which said light shading element has shaded the incident light to the photoelectric conversion device section by control operation of said light shading operation control element.

8. An image sensing apparatus according to claim 6, wherein said image sensing device driving circuit controls supply of said pulses to said image sensing device so as to perform charge transfer operation in said vertical shift registers at a speed lower than that of usual signal charge transfer from a period of time in which said light shading element shades incident light to the photoelectric conversion device section of the image sensing device or during an operation period of time which is in the process to reach said period of time in which said light shading element has shaded the incident light to the photoelectric conversion device section by control operation of said light shading operation control element, and controls said vertical shift registers to stop charge transfer operation in said image sensing device during a period from a beginning of a predetermined unit period for obtaining a signal expressing an image after this charge transfer operation at low-speed to completion of a frequency of transfer operation corresponding to a number of elements of an optical black portion.

9. An image sensing apparatus comprising:

an image sensing device that includes a photoelectric conversion device section, vertical shift registers, and a horizontal shift register, where a signal charge storage period corresponding to an effective exposure time is controlled by controlling a time interval when signal charges generated in said photoelectric conversion device section are integrated, and signal charges stored in the photoelectric conversion device section during the signal charge storage period can be read through the vertical shift registers and the horizontal shift register;

an image sensing device driving circuit that supplies pulses for controlling the signal charge storage period to said image sensing device, pulses for driving the vertical shift register, and pulses for driving the horizontal shift register;

a light shading element for shading incident light to the photoelectric conversion device section of said image sensing device; and a light shading operation control element for controlling operation timing of said light shading element, said image sensing device driving circuit controlling supply of said pulses to said image sensing device so as to perform a charge transfer operation in said vertical shift registers at a speed lower than that of usual signal charge transfer during an operation period that is in process to a state where said light shading element shades incident light to the photoelectric conversion device section of the image sensing device by control operation of said light shading operation control element, and being controlled so that occurrence of charge transfer pulses in said operation period may be discrete to an extent where influence of a defect in the vertical shift registers does not occur.

10. An image sensing apparatus comprising:

an image sensing device that includes a photoelectric conversion device section, vertical shift registers, and a horizontal shift register, where a signal charge storage period corresponding to an effective exposure time is controlled by controlling a time interval when signal charges generated in said photoelectric conversion device section are integrated, and signal charges stored in the photoelectric conversion device section during the signal charge storage period can be read through the vertical shift registers and the horizontal shift register;

an image sensing device driving circuit that supplies pulses for controlling the signal charge storage period to said image sensing device, pulses for driving the vertical shift registers, and pulses for driving the horizontal shift register;

a light shading element for shading incident light to the photoelectric conversion device section of said image sensing device; and a light shading operation control element for controlling operation timing of said light shading element, said image sensing device driving circuit stopping clamp pulses during a period when unnecessary electric charges are included in an optical black portion by discharge operation from a beginning of a predetermined unit period in the predetermined unit period used for obtaining a signal expressing an image by supplying said respective pulses to the image sensing device, said light shading operation control element controlling operation timing of said light shading element so that a substantial light shading state to the photoelectric conversion device section of said image sensing device may be established within said unit period after an endpoint of said signal charge storage period.

* * * * *